(12) United States Patent
Shaw et al.

(10) Patent No.: US 9,264,077 B2
(45) Date of Patent: Feb. 16, 2016

(54) MOBILE COMMUNICATIONS DEVICE INCLUDING AN RF TRANSMITTER PROVIDING IMPEDANCE FLUCTUATION DAMPENING AND RELATED METHODS

(75) Inventors: Dennis Keith Shaw, Flower Mound, TX (US); Prasad Venkatesh Madabusi Srinivasan, Irving, TX (US)

(73) Assignee: BLACKBERRY LIMITED, Ontario (CA)

( * ) Notice: Subject to any disclaimer, the term of this patent is extended or adjusted under 35 U.S.C. 154(b) by 491 days.

(21) Appl. No.: 13/484,668

(22) Filed: May 31, 2012

(65) Prior Publication Data
US 2013/0324060 A1 Dec. 5, 2013

(51) Int. Cl.
*H04B 1/04* (2006.01)
*H04B 1/18* (2006.01)

(52) U.S. Cl.
CPC .............. *H04B 1/0458* (2013.01); *H04B 1/18* (2013.01); *Y10T 29/49117* (2015.01)

(58) Field of Classification Search
CPC .......................... H03G 3/3052; H03G 1/0088
USPC ................. 455/107, 115.1, 117, 127.1, 127.2
See application file for complete search history.

(56) References Cited

U.S. PATENT DOCUMENTS

| | | | | |
|---|---|---|---|---|
| 3,569,965 A * | 3/1971 | Bagley | ...................... | H03L 7/16 342/98 |
| 4,523,155 A * | 6/1985 | Walczak | .............. | H03G 3/3042 330/279 |
| 5,642,075 A * | 6/1997 | Bell | ...................... | H03G 3/3026 330/129 |
| 6,349,216 B1 * | 2/2002 | Alberth et al. | ............. | 455/550.1 |
| 6,893,101 B2 * | 5/2005 | Marra | ..................... | H03F 3/193 330/133 |
| 7,088,971 B2 * | 8/2006 | Burgener | ................ | H03F 1/223 330/10 |
| 7,202,734 B1 * | 4/2007 | Raab | ......................... | H03F 3/04 330/126 |
| 7,263,337 B2 * | 8/2007 | Struble | ............... | H03K 17/063 333/101 |
| 7,356,102 B2 | 4/2008 | Morton et al. | | |
| 7,711,334 B2 * | 5/2010 | Sivasubramaniam | .... | H04B 1/18 455/130 |
| 7,999,484 B2 * | 8/2011 | Jurngwirth | ......... | H05B 33/0851 315/185 S |

(Continued)

FOREIGN PATENT DOCUMENTS

WO 2005022740 3/2005
WO 2010010525 1/2010

OTHER PUBLICATIONS

Patachaianand et al., "Performance comparison of adaptive power control in UMTS", Wireless Broadband and Ultra Wideband Communication, Aug. 2007, pp. 81-85.

*Primary Examiner* — Hai V Nguyen
(74) *Attorney, Agent, or Firm* — Guntin & Gust, PLC; Andrew Gust

(57) ABSTRACT

A mobile communications device may include an RF signal source configured to generate RF signals over an RF frequency band(s), and an RF transmitter coupled to the RF signal source. The RF transmitter may include an RF amplifier configured to operate over a plurality of different power control levels. The RF amplifier may have an input configured to receive the RF signals from the RF signal source and an output having an impedance which changes based upon changes between the different power control levels. The RF transmitter may further include a shunt resistor(s) coupling the output of the amplifier to a voltage reference, and the shunt resistor(s) may be configured to decrease a highest impedance change of the RF amplifier output to below a threshold impedance level. An antenna(s) may be coupled to the output of the RF amplifier to operate over the at least one RF frequency band.

19 Claims, 11 Drawing Sheets

(56) References Cited

U.S. PATENT DOCUMENTS

| | | | | |
|---|---|---|---|---|
| 8,559,907 B2* | 10/2013 | Burgener | | H01Q 23/00 455/127.3 |
| 8,699,973 B2* | 4/2014 | Southcombe | | H03F 1/0227 375/297 |
| 2005/0017787 A1* | 1/2005 | Kojima | | H03K 17/168 327/432 |
| 2005/0059362 A1* | 3/2005 | Kalajo | | H03F 1/0261 455/127.1 |
| 2005/0110559 A1* | 5/2005 | Farkas | | H02M 3/07 327/536 |
| 2005/0245216 A1 | 11/2005 | Boos | | |
| 2005/0275480 A1 | 12/2005 | Nishio | | |
| 2005/0287976 A1* | 12/2005 | Burgener | | H03F 1/223 455/333 |
| 2006/0119331 A1* | 6/2006 | Jacobs | | H02M 3/3376 323/235 |
| 2007/0173805 A1* | 7/2007 | Weinberg et al. | | 606/34 |
| 2008/0233913 A1* | 9/2008 | Sivasubramaniam | | H04B 1/18 455/232.1 |
| 2010/0029226 A1 | 2/2010 | Visser | | |
| 2010/0321086 A1* | 12/2010 | See et al. | | 327/359 |
| 2011/0130104 A1* | 6/2011 | Villain | | H03F 1/52 455/127.1 |
| 2012/0064953 A1* | 3/2012 | Dagher | | H04W 52/52 455/571 |
| 2012/0235736 A1* | 9/2012 | Levesque | | H03F 1/0227 330/127 |
| 2012/0236958 A1* | 9/2012 | Deng | | H03F 1/0261 375/295 |
| 2012/0252384 A1* | 10/2012 | Burgener | | H01Q 23/00 455/127.1 |
| 2013/0005286 A1* | 1/2013 | Chan | | H04M 1/7255 455/127.2 |
| 2015/0270806 A1* | 9/2015 | Wagh | | H03F 1/0205 330/296 |

* cited by examiner

| IMPEDANCE Z-x-jy | | | | | | | | | |
|---|---|---|---|---|---|---|---|---|---|
| MEASURED DATA ORIGINAL BASELINE | | | | MEASURED DATA WITH 30 OHM SHUNT RESISTOR | | | PREDICTED DATA WITH 30 OHM SHUNT RESISTOR | | |
| AGC | X | Y | d | AGC | X | Y | d | AGC | X | Y | d |
|---|---|---|---|---|---|---|---|---|---|---|---|
| 60 | 11.095 | -6.065 | 0.387 | 60 | 11.047 | 7.8681 | 0.174 | 60 | 8.5663775 | -3.1632783 | 0.201 |
| 61 | 11.158 | -6.4469 | 1.606 | 61 | 11.186 | 7.7642 | 0.749 | 61 | 8.6567145 | -3.345166 | 0.851 |
| 62 | 10.442 | -5.0092 | 0.129 | 62 | 10.491 | 8.0443 | 0.051 | 62 | 8.0821631 | -2.7147725 | 0.070 |
| 63 | 10.436 | -4.8806 | 0.105 | 63 | 10.452 | 8.077 | 0.053 | 63 | 8.0622029 | -2.6478784 | 0.057 |
| 64 | 10.412 | -4.7783 | 0.215 | 64 | 10.415 | 8.1144 | 0.089 | 64 | 8.0364511 | -2.5969619 | 0.117 |
| 65 | 10.482 | -4.982 | 0.026 | 65 | 10.482 | 8.0564 | 0.020 | 65 | 8.0995894 | -2.6952187 | 0.014 |
| 66 | 10.458 | -4.991 | 0.011 | 66 | 10.497 | 8.0438 | 0.009 | 66 | 8.0881695 | -2.7030982 | 0.006 |
| 67 | 10.459 | -5.0016 | 1.232 | 67 | 10.489 | 8.0478 | 0.580 | 67 | 8.0900914 | -2.7085345 | 0.655 |
| 68 | 11.087 | -6.0612 | 1.198 | 68 | 11.044 | 7.8807 | 0.540 | 68 | 8.5618094 | -3.1625857 | 0.622 |
| 69 | 11.091 | -7.2594 | 0.298 | 69 | 11.414 | 7.4873 | 0.124 | 69 | 8.7603062 | -3.7523407 | 0.154 |
| 70 | 11.081 | -7.5573 | 1.683 | 70 | 11.505 | 7.4032 | 0.755 | 70 | 8.8091935 | -3.898281 | 0.873 |
| 71 | 11.142 | -5.8752 | 0.565 | 71 | 10.993 | 7.9582 | 0.258 | 71 | 8.5617283 | -3.061449 | 0.292 |
| 72 | 11.392 | -6.3819 | 0.276 | 72 | 11.237 | 7.8755 | 0.132 | 72 | 8.7615501 | -3.274586 | 0.142 |
| 73 | 11.372 | -6.6571 | 0.126 | 73 | 11.321 | 7.7735 | 0.067 | 73 | 8.7951813 | -3.4120323 | 0.065 |
| 74 | 11.37 | 6.7833 | 0.992 | 74 | 11.36 | 7.7187 | 0.457 | 74 | 8.8146739 | 3.4736868 | 0.513 |
| 75 | 11.119 | -5.8232 | 2.971 | 75 | 10.969 | 7.9544 | 1.383 | 75 | 8.5426508 | -3.0387518 | 1.560 |
| 76 | 10.356 | -8.6947 | 0.326 | 76 | 11.675 | 6.7653 | 0.114 | 76 | 8.8877695 | -4.5917199 | 0.172 |
| 77 | 10.239 | -8.9986 | 0.562 | 77 | 11.741 | 6.6726 | 0.239 | 77 | 8.6989036 | -4.763539 | 0.297 |
| 78 | 10.429 | -8.4699 | 0.075 | 78 | 11.61 | 6.8727 | 0.050 | 78 | 8.6747288 | -4.4676572 | 0.040 |
| 79 | 10.46 | -8.4015 | 1.298 | 79 | 11.602 | 6.9225 | 0.573 | 79 | 8.6752939 | -4.4280652 | 0.681 |
| 80 | 10.901 | -7.1803 | 1.001 | 80 | 11.351 | 7.4372 | 0.447 | 80 | 8.6535233 | -3.7474416 | 0.525 |
| 81 | 10.512 | -8.1022 | 1.149 | 81 | 11.512 | 7.0198 | 0.541 | 81 | 8.6387673 | -4.2721411 | 0.607 |
| 82 | 10.215 | -9.2122 | 2.652 | 82 | 11.81 | 6.5679 | 1.205 | 82 | 8.7361088 | -4.8709988 | 1.391 |
| 83 | 11.043 | -6.6925 | 1.126 | 83 | 11.236 | 7.627 | 0.503 | 83 | 8.6397223 | -3.4830217 | 0.587 |
| 84 | 10.772 | -7.7856 | 0.263 | 84 | 11.531 | 7.2192 | 0.107 | 84 | 8.7026083 | -4.0668344 | 0.137 |
| 85 | 10.915 | -7.5648 | 0.580 | 85 | 11.438 | 7.2716 | 0.252 | 85 | 8.7302732 | -3.9325731 | 0.301 |
| 86 | 11.059 | -7.0031 | 0.061 | 86 | 11.308 | 7.487 | 0.042 | 86 | 8.6999701 | -3.632973 | 0.032 |
| 87 | 11.033 | 6.9470 | 1.269 | 87 | 11.291 | 7.5253 | 0.565 | 87 | 8.6777611 | 3.6103815 | 0.657 |
| 88 | 11.38 | -5.7271 | 2.455 | 88 | 11.051 | 8.0363 | 1.159 | 88 | 8.6591525 | -2.953629 | 1.279 |
| 89 | 11.243 | -3.2757 | 1.100 | 89 | 10.364 | 8.9703 | 0.514 | 89 | 8.3149097 | -1.722325 | 0.574 |
| 90 | 11.426 | -4.3604 | 0.016 | 90 | 10.653 | 8.5448 | 0.019 | 90 | 8.5125761 | -2.26174 | 0.008 |
| 91 | 11.432 | -4.3459 | 0.997 | 91 | 10.665 | 8.5307 | 0.491 | 91 | 8.5140568 | -2.2537111 | 0.519 |
| 92 | 11.359 | -3.3512 | 0.038 | 92 | 10.375 | 8.9267 | 0.046 | 92 | 8.3812547 | -1.7517043 | 0.020 |
| 93 | 11.342 | -3.3856 | 0.225 | 93 | 10.329 | 8.9236 | 0.081 | 93 | 8.3753939 | -1.7708932 | 0.118 |
| 94 | 11.227 | -3.1922 | 0.026 | 94 | 10.307 | 9.0012 | 0.075 | 94 | 8.2997474 | -1.6802471 | 0.014 |
| 95 | 11.209 | -3.2112 | 0.044 | 95 | 10.233 | 9.0109 | 0.064 | 95 | 8.2919278 | -1.6915956 | 0.023 |
| 96 | 11.252 | -3.2178 | 0.048 | 96 | 10.297 | 9.0128 | 0.027 | 96 | 8.3148204 | -1.6915197 | 0.025 |
| 97 | 11.209 | -3.1955 | 0.583 | 97 | 10.314 | 8.9912 | 0.303 | 97 | 8.2906497 | -1.6834242 | 0.308 |
| 98 | 11.163 | -2.6144 | | 98 | 10.083 | 9.1866 | | 98 | 8.2235494 | -1.3830953 | |
| MAX DELTA | | 2.971 | | | | 1.383 | | | | | 1.560 |

FIG. 4

MOBILE COMMUNICATIONS DEVICE INCLUDING AN RF TRANSMITTER PROVIDING IMPEDANCE FLUCTUATION DAMPENING AND RELATED METHODS

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Mobile communication devices are required to meet certain operational standards for the respective frequency bands over which they communicate. For example, UMTS cellular devices are typically required to meet inner loop power control (ILPC) requirements. ILPC in the uplink is the ability of the mobile transmitter to adjust its output power in accordance with one or more transmit power control (TPC) commands received in the downlink. The mobile transmitter may be required to change its output power with various step sizes (e.g., 1 dB, 2 dB and 3 dB) while remaining within a certain power control range.

BRIEF DESCRIPTION OF THE DRAWINGS

FIG. 4 is a set of three tables illustrating impedance values for the transmitter configuration of FIG. 3 measured without a shunt resistor, measured with a shunt resistor, and predicted with the shunt resistor.

DETAILED DESCRIPTION

Figure 1:
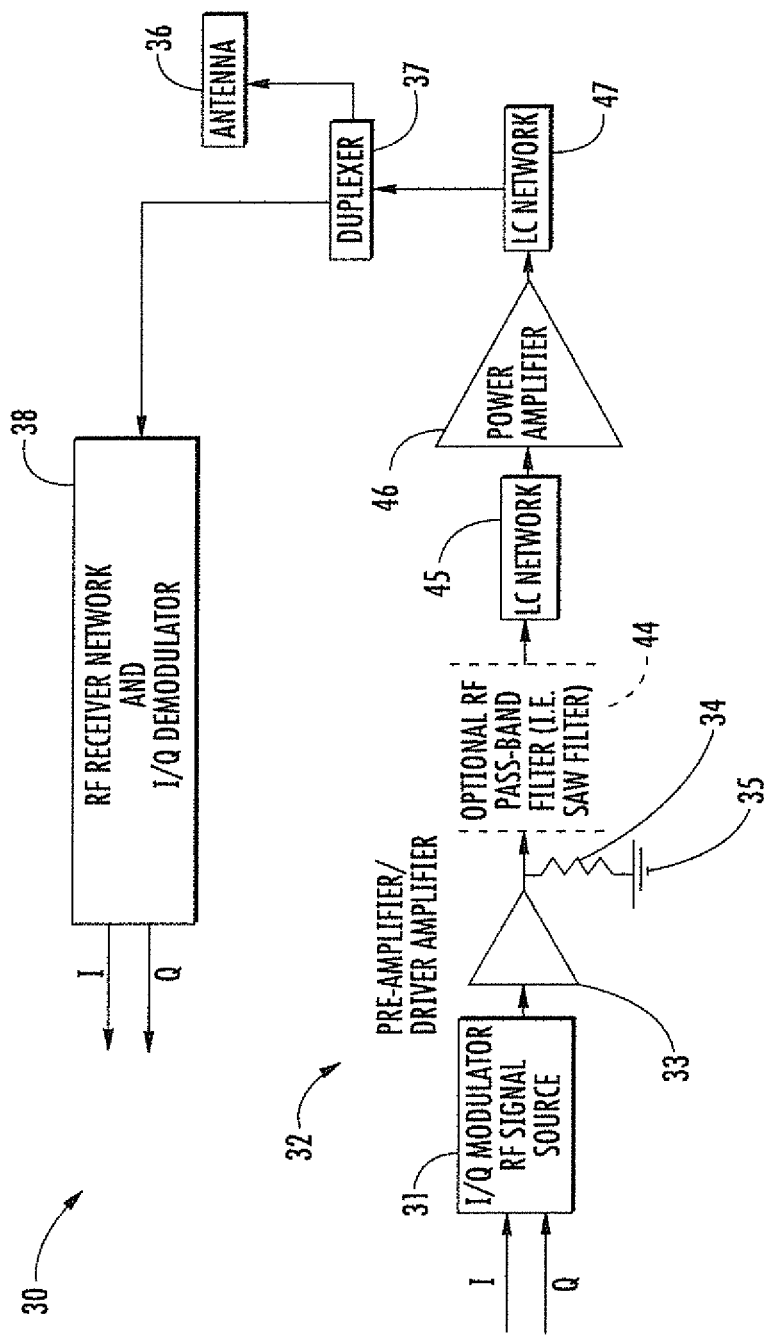
FIG. 1 is a schematic block diagram of a mobile communications device in accordance with an example embodiment.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile communications device is provided herein which may include a radio frequency (RF) signal source configured to generate RF signals over at least one RF frequency band, and an RF transmitter coupled to the RF signal source. The RF transmitter may include an RF amplifier configured to operate over a plurality of different power control levels. The RF amplifier may have an input configured to receive the RF signals from the RF signal source and an output having an impedance which changes based upon changes between the different power control levels. The RF transmitter may further include at least one shunt resistor coupling the output of the amplifier to a voltage reference, and the at least one shunt resistor may be configured to decrease a highest impedance change of the RF amplifier output to below a threshold impedance level. The mobile communications device may further include at least one antenna coupled to the output of the RF amplifier and configured to operate over the at least one RF frequency band. Thus, the RF transmitter may advantageously be configured to provide an output that remains with desired testing or operational parameters, such as inner loop power control (ILPC) output level parameters for Universal Mobile Telecommunications System (UMTS) frequency band operation, for example, as a result of the impedance dampening provided by the at least one shunt resistor.

More particularly, the mobile communications device may optionally include a pass-band filter, such as a surface acoustic wave (SAW) filter, for example, having an input coupled to the output of the amplifier, and an output coupled to the at least one antenna. In accordance with one example, the at least one shunt resistor may comprise a plurality of parallel-connected resistors. In accordance with another example, the at least one shunt resistor may comprise a plurality of series-connected resistors. Other examples may include a pi resistor network, a T resistor network, etc.

The mobile communications device may further include at least one of a capacitor and an inductor coupled in series or in parallel with the at least one shunt resistor. By way of example, the voltage reference may comprise ground.

A related method for making a mobile communications device may include coupling an input of an RF amplifier to an RF signal source. The RF signal source may be configured to generate RF signals over at least one RF frequency band, and the RF amplifier may be configured to operate over a plurality of different power control levels and have an output with an impedance which changes based upon changes between the different power control levels. The method may further include determining a highest impedance change of the RF amplifier output based upon the changes between the different power control levels, and coupling at least one shunt resistor between the output of the amplifier and a voltage reference, where the at least one shunt resistor may be configured to decrease a highest impedance change of the RF amplifier output to below a threshold impedance level. The method may further include coupling at least one antenna to the output of the RF amplifier, where the at least one antenna may be configured to operate over the at least one RF frequency band.

Referring initially to FIG. 1, a mobile communications device 30 is first described. Example mobile communications devices 30 may include portable or personal media players (e.g., music or MP3 players, video players, etc.), portable gaming devices, portable or mobile telephones, smartphones, tablet computers, digital cameras, etc. The mobile communications device 30 illustratively includes a radio frequency (RF) transmit path 32 including an RF signal source 31 configured to generate RF signals over one or more RF frequency bands. By way of example, the RF signal source 31 may include a modulator and other appropriate components for modulating information or data to be transmitted by the mobile communications device 30 to desired transmission frequencies. In the illustrated example, the RF signal source 31 comprises an I/Q modulator RF signal source, although other RF signal sources may be used in different embodiments. In the context of the present description, UMTS cellular frequency bands are discussed for purposes of illustration, but the devices and methods described herein may also be used with other cellular or wireless frequency bands in different embodiments.

The RF transmit path 32 further illustratively includes an RF amplifier 33, which in the present example is configured as a pre-amplifier or driver amplifier. The RF pre-amplifier 33 is configured to operate over a plurality of different power control levels. The pre-amplifier 33 has an input configured to receive the RF signals from the RF signal source 31, and an output having an impedance which changes based upon changes between the different power control levels, as will be described further below. The pre-amplifier 33 may be implemented as a discrete component, or it may be included along with other components in an integrated circuit (IC) package, for example.

One or more shunt resistors 34 are illustratively coupled between the output of the pre-amplifier 33 and a voltage reference, which in the present example is ground 35, although other voltage references may be used in different embodiments. The shunt resistor 34 is configured to decrease a highest impedance change of the RF amplifier 33 output to below a threshold impedance level, as will also be discussed further below. It should be noted that while the shunt resistor 34 is described in the present example as being associated with the output of the RF pre-amplifier 33, the impedance dampening techniques described herein may be used with other amplifier configurations as well.

The mobile communications device 30 further illustratively includes an optional RF pass-band filter 44, such as a surface acoustic wave (SAW) filter, coupled to the output of the RF pre-amplifier 33 and configured to operate over the appropriate RF frequency band(s). The output of the filter 44 may optionally be coupled to a first LC network 45, which has an output coupled to an input of an RF power amplifier 46, and the RF power amplifier has an output coupled to a second LC network 47. A duplexer 37 selectively couples an antenna 36 between the second LC network 47 or an RF receiver network-I/Q demodulator path 38 of the mobile communications device 30.

Figure 2:
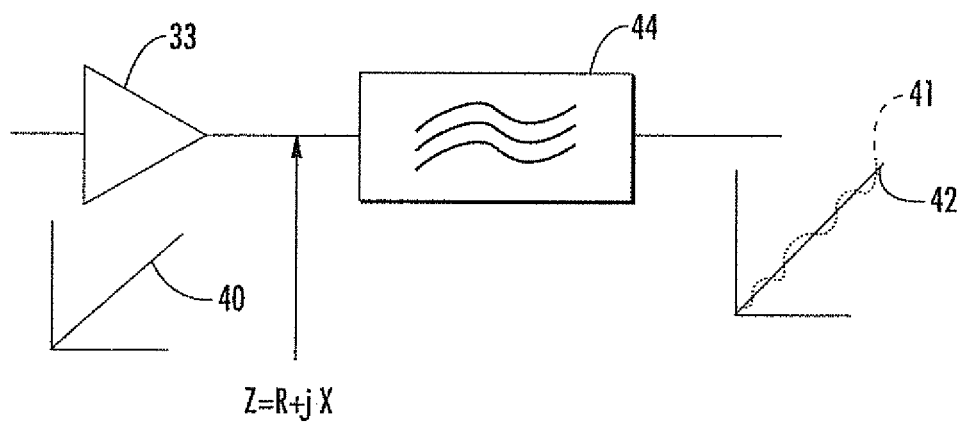
FIGS. 2 and 3 are schematic block diagrams of example implementations of the RF transmitter of the mobile communications device of FIG. 1.
Figure 3:
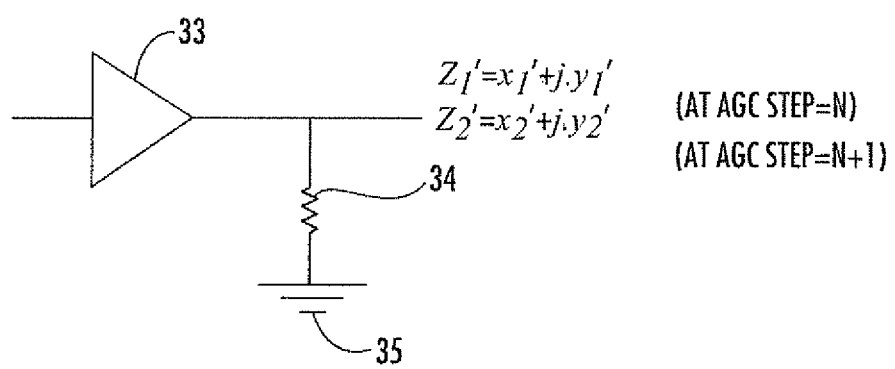

The undesirable change of output impedance of the pre-amplifier 33 is illustrated in FIG. 2, in which a linear ramping input signal 40 (shown in the graph under the amplifier) causes an impedance Z of the amplifier output to aberrantly change with changes in power control level across the dynamic operating range of the pre-amplifier. The output impedance Z of the pre-amplifier 33 is represented by the equation $Z=R+jX$, as shown. As shown by the graph at the output of the filter 44, the an output signal 41 represented with a dashed line includes several variations which represent deviations from the ideal linear ramping signal 42 that result from the changes or fluctuations in the output impedance of the pre-amplifier 33 as it is driven throughout its dynamic range of operation.

More particularly, when the output load to the pre-amplifier 33 is a SAW filter, for example, the changes in the pre-amplifier output impedance can change the pass-band response of the SAW filter. The instantaneous changes in load impedance directly impact the SAW filter frequency response, and may adversely affect a signal which is ramping in a linear manner. As the input load impedance to the SAW filter varies, it causes variations in the SAW filter return loss and insertion loss. Typically, transmit channel frequency compensation calibration is performed at one fixed power level. However, a typical calibration approach will not compensate for the varying frequency response across the different transmit power levels. As such, these variations increase the error in ILPC performance. Such distortion of a linear ramping signal may adversely impact mobile transmitter performance in relation to the inner loop power control (ILPC) requirements, as specified in section 5.4.2. of the 3GPP TS 34.121 V6.0.0 (2005-03) Technical Specification entitled "3rd Generation Partnership Project; Technical Specification Group Terminals; Terminal conformance specification; Radio transmission and reception (FDD) (Release 6)", which is hereby incorporated herein in its entirety by reference.

The shunt resistor(s) 34 may advantageously be used to dampen the effect of the instantaneous changes in the output impedance of the pre-amplifier 33. This dampening effect tends to reduce the variation in input impedance to the SAW filter 44, for example. Consequently, as the filter input impedance is held more constant, the pass-band frequency response of the SAW filter tends to show less variation. With less variation in the pass-band frequency response, a signal which is ramping in a linear manner tends to maintain the characteristics of the linear ramp, which in turn advantageously reduces error in ILPC steps, for example.

More particularly, section 5.4.2 of the 3GPP ETSI TS 34.121 defines the requirements for Inner Loop Power Control in the uplink. In general terms, when the mobile device is directed by the base station to increase or decrease its transmit power in 1 dB increments, then the mobile device has to increase or decrease its transmit power by 1 dB within a +/−0.5 da window of error. Steps "E" and Step "F" of the ILPC requirement may be particularly difficult sections of the test to pass, since these portions of the test stress the power amplifier and pre-amplifiers by increasing/decreasing the transmit power throughout the dynamic range of the RF transmitter 32. Typically this range is from −60 dBm to +24 dBm, although other test configurations may be used in different embodiments.

As noted above, the approach set forth herein advantageously uses a one or more shunt resistors 34 to dampen variation in the output impedance of the pre-amplifier 33. The shunt resistance tends to clamp the amount of variation in the output impedance of the pre-amplifier 33. The shunt resistor 44 does not eliminate the variation, but instead restricts the variation so that the pass-band response of the SAW filter is held more constant over the signal ramp, such as during step "E" and step "F" of the ILPC test, for example. This keeps the frequency response more constant as the power level varies.

An example approach for determining appropriate shunt resistor 34 values for different RF transmitter path 32 configurations is now described with reference to FIGS. 3 through 7. More particularly, this approach allows for evaluation of a shunt resistor(s) 34 values that are based on worst case test results during an ILPC measurement for UMTS bands, although these techniques may also be applicable to other frequency bands and operating configurations, for example. The calculated value of the shunt resistor 34 is implemented at the output of the pre-amplifier 33, as shown in the schematic diagram of FIG. 3, and measured results will demonstrate how the margins for ILPC are improved based upon this configuration.

An example methodology for choosing the shunt resistor 34 value is as follows. At the system level, a region of worst case ILPC performance may be measured and recorded, along with the corresponding AGC values for the pre-amplifier 33. Furthermore, at the device level, data may be gathered on the output impedance of the pre-amplifier 33 as the AGC is stepped through the dynamic range of interest. Using equation set 1 below, the location of the worst case impedance variation as the AGC is stepped over the operating frequency range is determined. The values $Z_1$ and $Z_2$ represent the impedance measured at consecutive AGC steps. More specifically, $Z_1$ and $Z_2$ are measured impedances at consecutive AGC steps where the worst case (i.e., greatest) impedance variation $d_o$ is observed. The first table of FIG. 4 shows the relative impedance variation $d_o$ versus AGC settings for the original measured baseline data for the pre-amplifier 33 in an example UMTS transmitter implementation with no shunt resistor coupled to its output.

$$Z_1 = x_1 + j \cdot y_1$$
$$Z_2 = x_2 + j \cdot y_2$$
$$d_o = \sqrt{(x_1 - x_2)^2 + (y_1 - y_2)^2}$$

Equation Set 1:

Equation set 1 demonstrates the relative impedance change. For example, $Z_1$ represents the measured impedance at AGC=N, and $Z_2$ represents the measured impedance at AGC=N+1. This allows the relative impedance change $d_o$ to be calculated so that it may be determined where the impedance change is the largest, which is typically where ILPC errors will occur.

Next, a shunt resistor to ground may be placed on the output of the pre-amplifier 33 to dampen the impedance variations. These impedance variations bring about ILPC errors at the system level. In the example shown in FIG. 3, a single shunt resistor 34 couples the output of the amplifier 33 to ground 35 to dampen the output impedance variations, although other resistor configurations may be used, as will be discussed further below. Using equation set 2 below, the impedance variation dampening effect of different shunt resistor values may be determined. The second and third tables of FIG. 4 respectively show measured and calculated data for an example case of a single shunt resistor 34 having a value of 30 Ohms coupling the output of the pre-amplifier 33 to ground 35.

$$Z'_1 = x'_1 + j \cdot y'_1$$
$$Z'_2 = x'_2 + j \cdot y'_2$$
$$x'_1 = \frac{R^2 \cdot x_1 + R \cdot x_1^2 + R \cdot y_1^2}{R^2 + 2 \cdot R \cdot x_1 + x_1^2 + y_1^2}$$
$$y'_1 = \frac{R^2 \cdot y_1}{R^2 + 2 \cdot R \cdot x_1 + x_1^2 + y_1^2}$$
$$x'_2 = \frac{R^2 \cdot x_2 + R \cdot x_2^2 + R \cdot y_2^2}{R^2 + 2 \cdot R \cdot x_2 + x_2^2 + y_2^2}$$
$$y'_2 = \frac{R^2 \cdot y_2}{R^2 + 2 \cdot R \cdot x_2 + x_2^2 + y_2^2}$$
$$d'_o = \sqrt{(x'_1 - x'_2)^2 + (y'_1 - y'_2)^2}$$

Equation Set 2

Generally speaking, an appropriate value for the shunt resistor 34 will be one which provides sufficient dampening of the impedance variations, yields corresponding ILPC improvements, and still yields acceptable signal output power from the amplifier 33. As noted above, measured and predicted data with a 30 Ohm shunt resistor 34 is shown in FIG. 4. The predicted data X and Y values vary from the measured values partly due to the phase rotation of the transmission line used during measurement, although the impedance changes correspond relatively closely. The largest variation in impedance (2.971) occurs between AGC steps 75 and 76.

Figure 5:
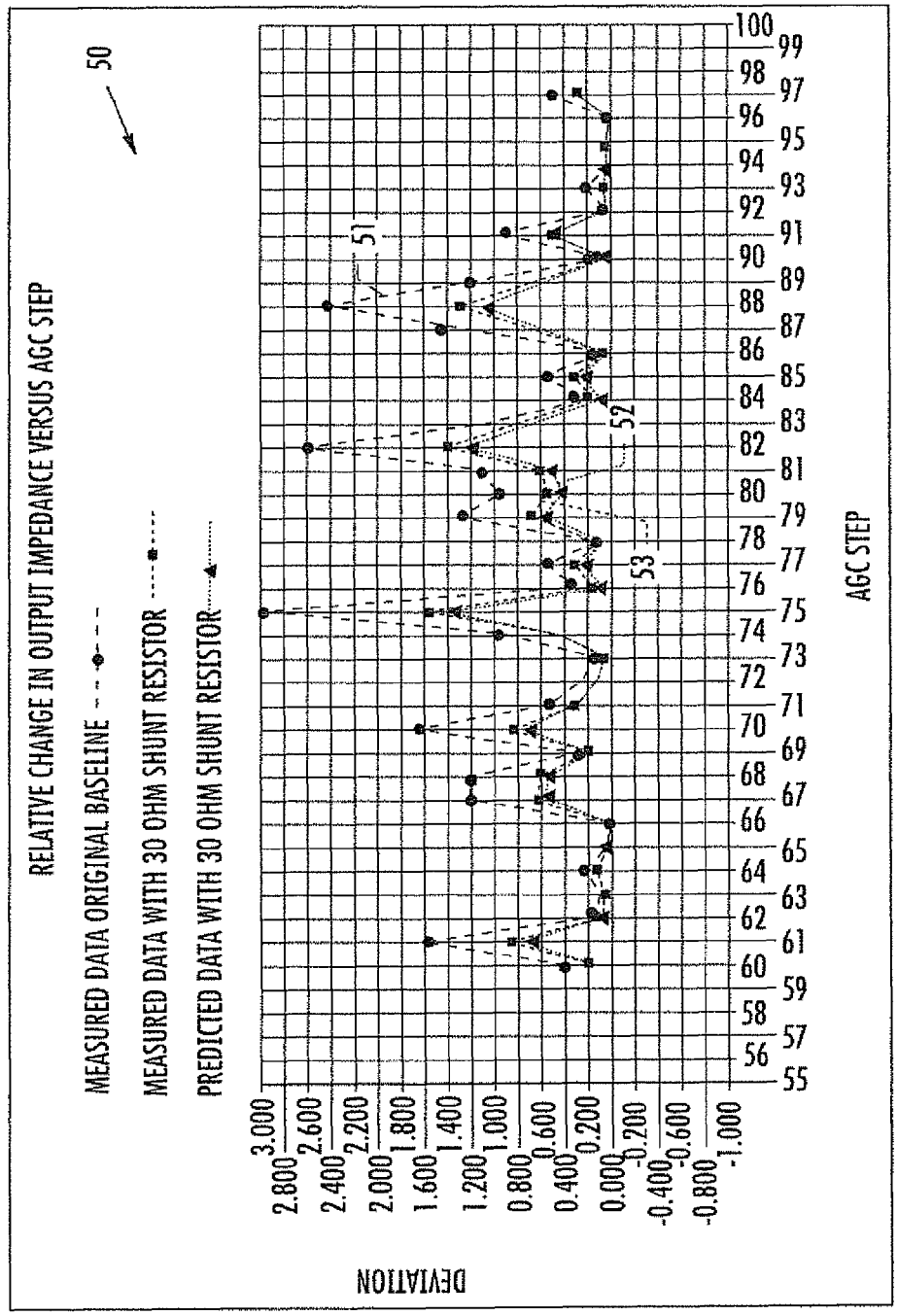
FIG. 5 is a graph of impedance deviation vs. automatic gain control steps for the tables of FIG. 4.

A graph 50 is shown in FIG. 5 which illustrates the tabular data from the tables of FIG. 4. The original measured baseline data without the shunt resistor 34 is represented by the graph line 51. The measured and predicted data for a 30 Ohm shunt resistor 34 is respectively represented by the graph lines 52 and 53. The addition of the 30 ohm shunt resistor 34 provides a reduction in the impedance changes or deviation $d_o$ of approximately 50%. It will also be observed that the predicted relative impedance variation corresponds well with the measured impedance variation, which may advantageously allow for different shunt resistor configurations to be simulated to determine expected results without having to build numerous different circuit models, for example.

Figure 6:
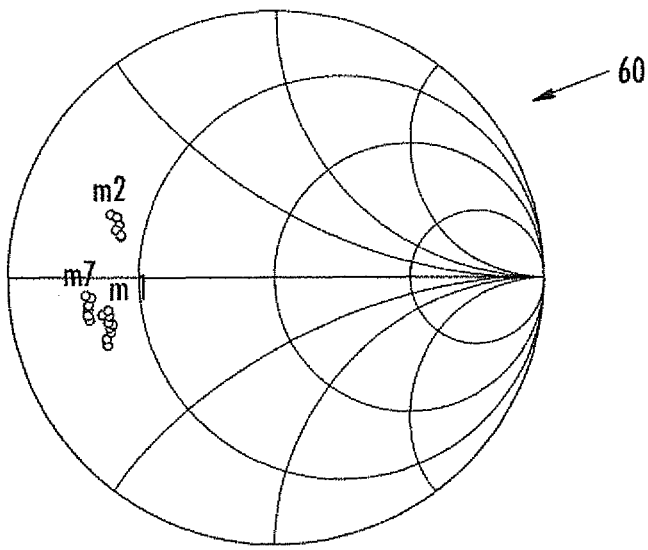
FIG. 6 is a Smith chart plot of the measured and predicted data from the tables of FIG. 4.
Figure 7:
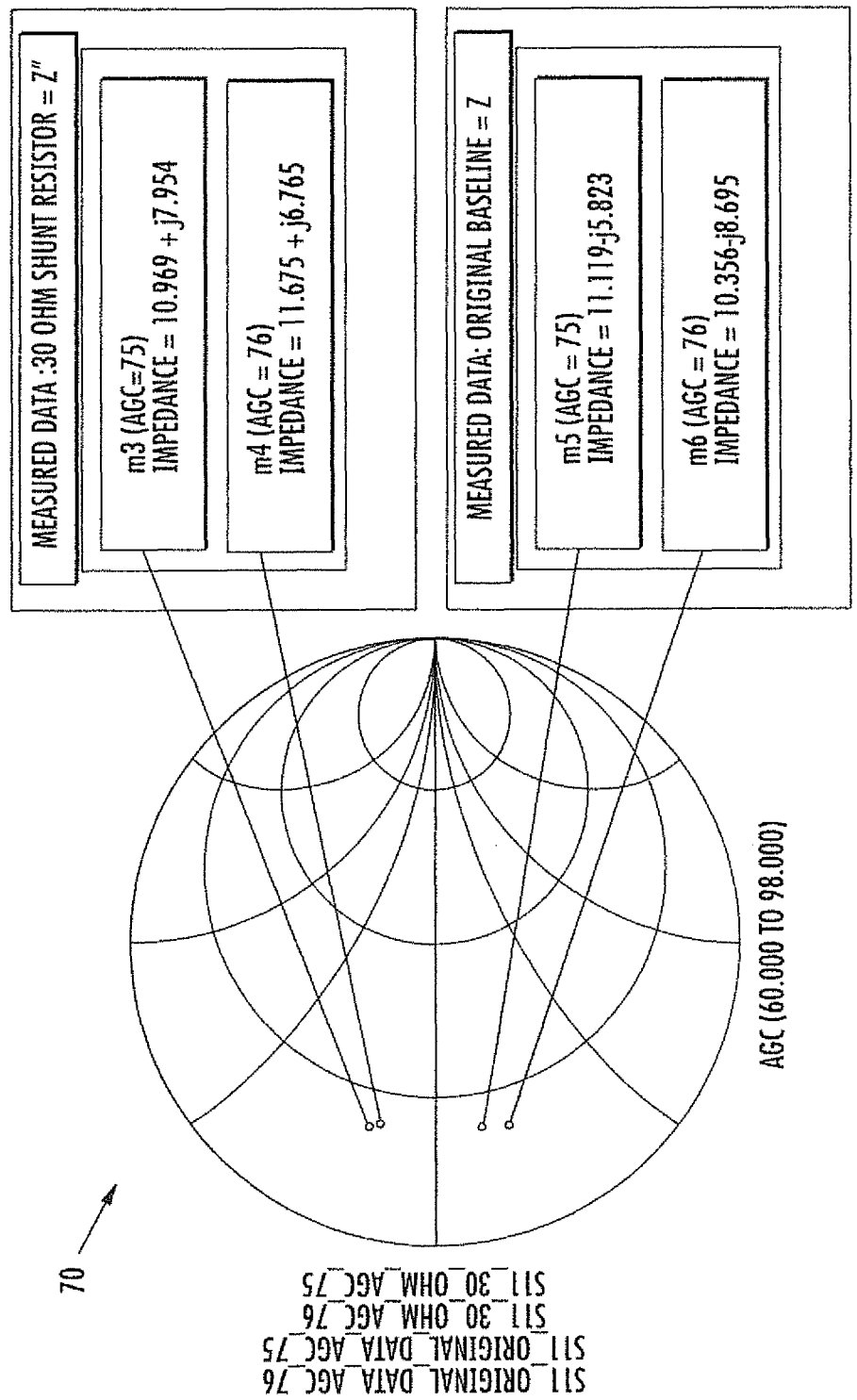
FIG. 7 is a Smith cart plot comparing the measured data from the tables of FIG. 4.

A corresponding Smith chart 60 of the measured and predicted data from the tables of FIG. 4 is shown in FIG. 6. In the chart 60, a marker m1 indicates the original measure S11 data without the 30 Ohm shunt resistor 34, while the markers m2 and m7 respectively indicate measured and predicted S11 data with the 30 Ohm shunt resistor. Moreover, a Smith chart 70 of FIG. 7 illustrates the difference in the measured data with and without the 30 Ohm shunt resistor 34 at AGC steps 75 and 76. As previously discussed, AGC step 75 and step 76 in this example represent the region of greatest impedance variation. The original amplifier 33 output impedance is plotted with markers m5 and m6, which show a relative $d_o$=2.97 for AGC steps 75 and 76. Next, the 30 ohm shunt resistor 34 is coupled between the output of the pre-amplifier 33 and ground 35. Markers m3 and m4 show the pre-amplifier 33 output impedance with the 30 ohm shunt resistor 34 placed on the output. Measured data shows the reduced/dampened impedance variation and a relative $d_o'$=1.38. Again, it will be seen that the impedance variation has been reduced by more than 50%. Different targets for impedance variation reduction (e.g., 25%, 50%, 75%, etc.) may be chosen based upon the amount of dampening that is required to meet applicable ILPC and signal output requirements in some embodiments.

Figure 8:
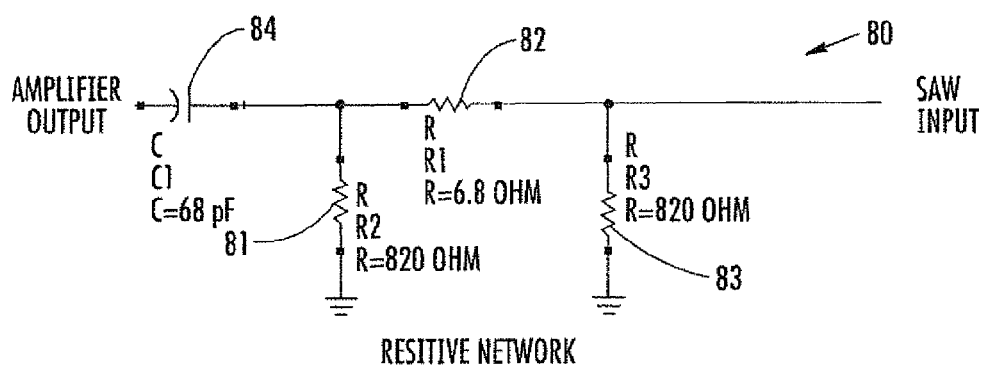
FIGS. 8-10 are a series of schematic diagrams illustrating various example shunt resistor configurations that may be used with the RF transmitter of FIG. 1.

As noted above, different shunt resistor configurations may be used in different embodiments. For example, a shunt resistor network 80 is shown in FIG. 8 which includes a capacitor 84 (61 pF) coupled to the output of the amplifier 33, a resistor 81 (820 Ohm) coupled between the capacitor and ground, a resistor 82 (6.8 Ohm) coupled between the capacitor and the filter 44 input, and a resistor 83 (820 Ohm) coupled between the SAW filter input and ground. More particularly, the resistors 81, 82, 83 are arranged in a "pi" configuration as shown. In another similar embodiment, the resistors 81, 82, 83 may instead be arranged in a "T" configuration, for example, with or without additional capacitors, inductors, resistors, etc.

Figure 9:
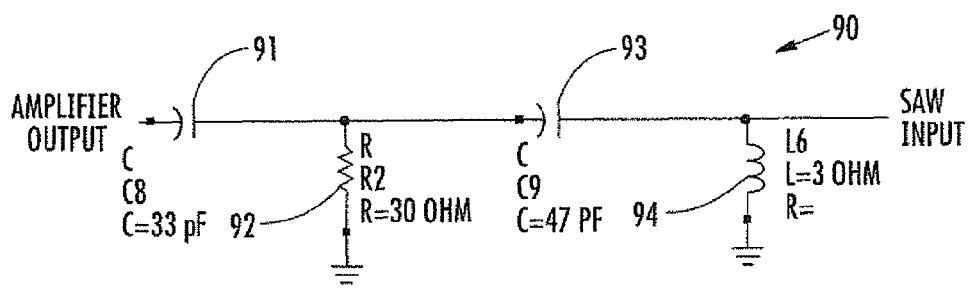
Figure 10:
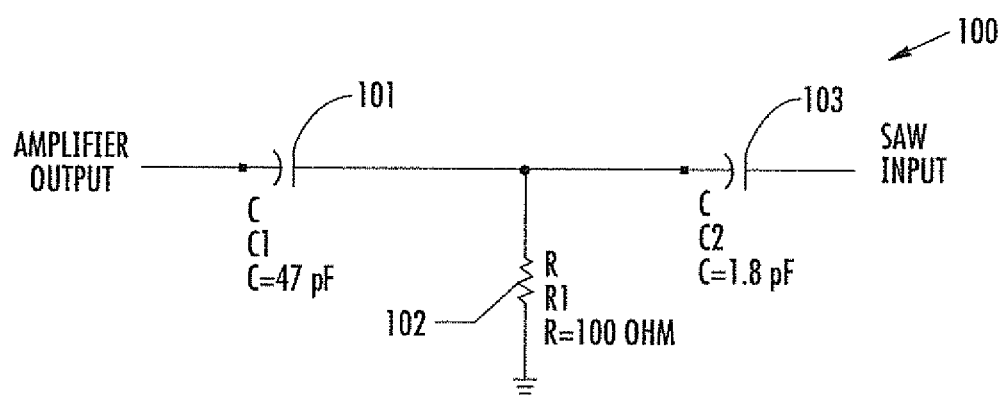

In another example embodiment shown in FIG. 9, a shunt resistor network 90 illustratively includes a capacitor 91 (33 pF) coupled to the output of the amplifier 33, a resistor 92 (30 Ohm) coupled between the capacitor 91 and ground, a capacitor 93 (4.7 pF) coupled between the capacitor 91 and the SAW filter 44 input, and an inductor 94 (3.3 nH) coupled between the SAW filter input and ground. Another similar configuration is shown in FIG. 10, in which a shunt resistor network 100 illustratively includes a capacitor 101 (47 pF) coupled to the output of the amplifier 33, a resistor 102 (100 Ohm) coupled between the capacitor 101 and ground, and a capacitor 103 (1.8 pF) coupled between the capacitor 101 and the SAW filter 44 input. Other suitable shunt resistor configurations may also be used for various RF transmitter configurations.

The above-described shunt resistance networks may also advantageously be used to help "clamp" the amount of variation in the output impedance of the amplifier 33 as described above for a single shunt resistor 34. By restricting the variation of the impedance, the pass-band response of the SAW filter 44 is held more constant over the signal ramp during step "E" and step "F" of the ILPC test, for example. This keeps the frequency response more constant as the power level varies.

Figure 11:
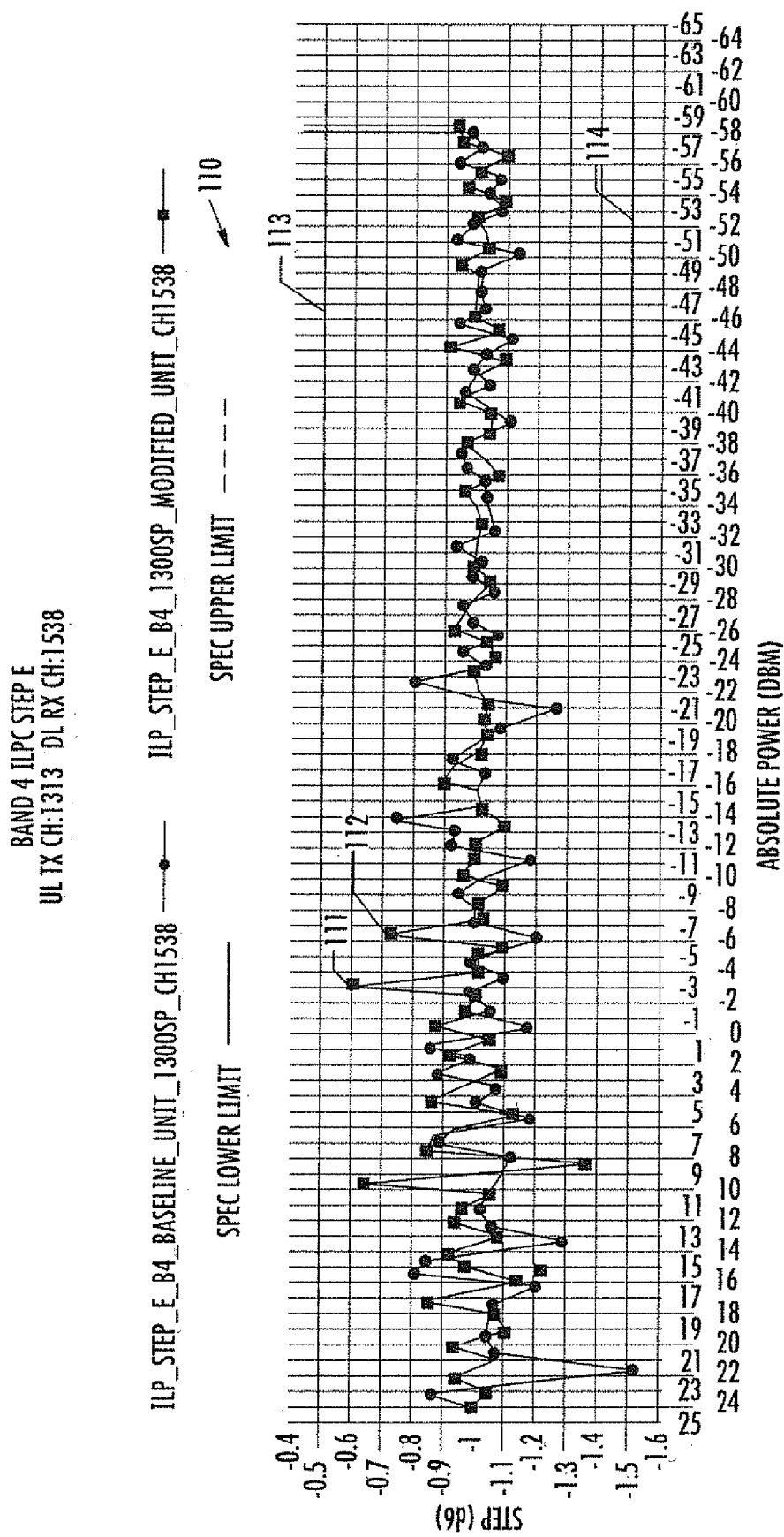
FIG. 11 is a graph of measured test results for ILPC step E testing of the mobile communications device of FIG. 1 with and without an impedance dampening shunt resistor.
Figure 12:
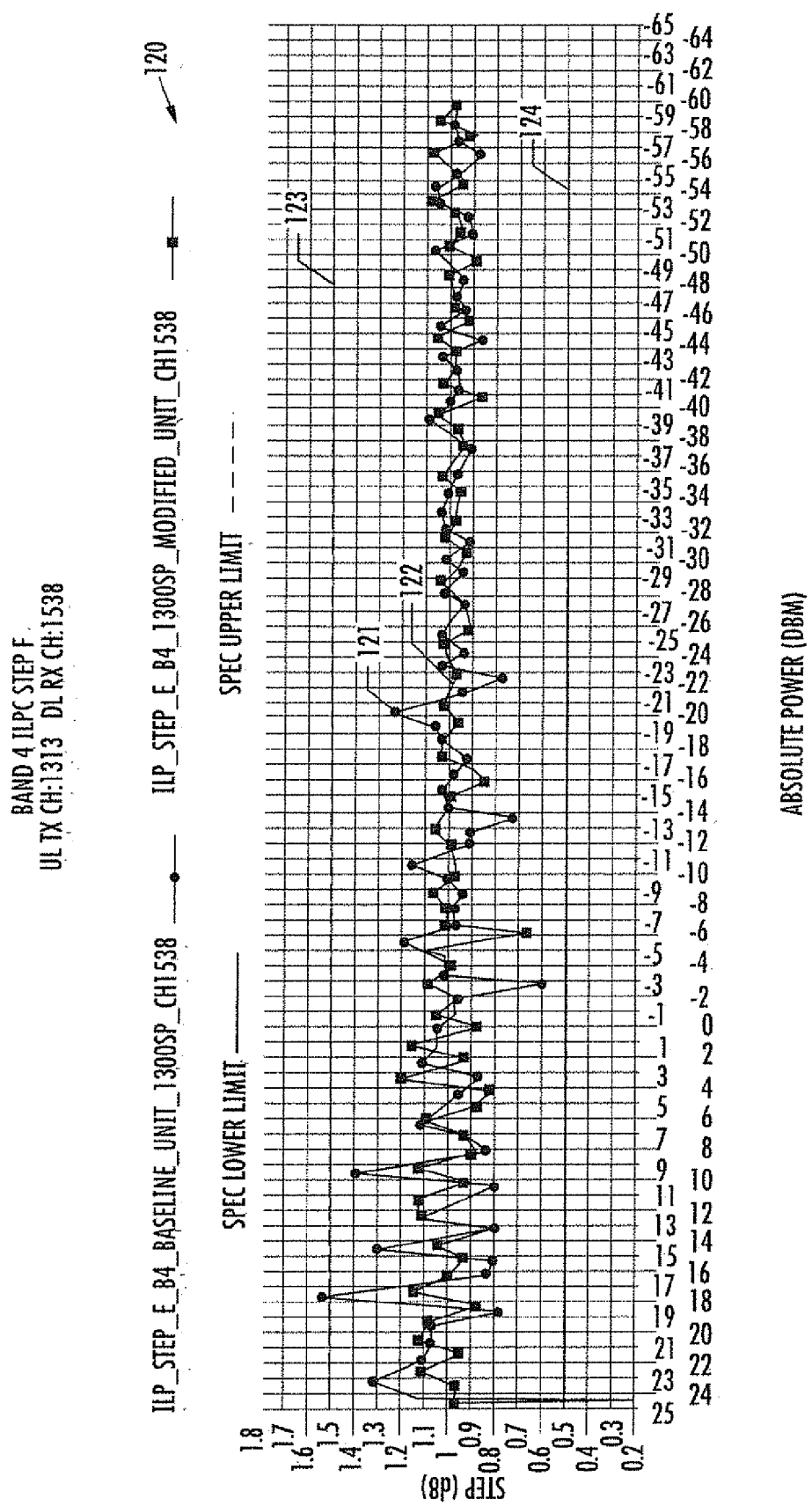
FIG. 12 is a graph of measured test results for ILPC step F testing of the mobile communications device of FIG. 1 with and without an impedance dampening shunt resistor.

More particularly, measured ILPC test results for steps E and F are respectively shown in the graphs 110 and 120 of FIGS. 11 and 12. For these test configurations, an RF transmitter chain 32 as shown in FIG. 1 with a 30 Ohm shunt resistor 34 was used. For the graph 110, the baseline measurements without the shunt resistor 34 are represented by the graph line 111, while the measurements taken with the addition of the shunt resistor are represented by the graph line 112. The upper and lower ILPC specification limits for step E are represented by horizontal lines 113 and 114, respectively. In this test configuration, the inclusion of the shunt resistor 34 avoids a lower specification limit failure between absolute power values of 21 and 22 dBm, as shown.

For the graph 120, the baseline measurements without the shunt resistor 34 are represented by the graph line 121, while the measurements taken with the addition of the shunt resistor are represented by the graph line 122. The upper and lower ILPC specification limits for step F are represented by horizontal lines 123 and 124, respectively. In this test configuration, the inclusion of the shunt resistor 34 avoids an upper specification limit failure between absolute power values of 17 and 18 dBm, as shown.

In addition, the above-described approach may advantageously provide a relatively low cost approach that has small or minimal impact on PCB board space. Furthermore, it may also advantageously be used to improve ILPC performance across all channels in an RF frequency band, and particularly on UMTS end channels. Current 3GPP specifications require testing only on mid-channels. However, in some cases, additional requirements from carriers, etc., may be applicable that necessitate ILPC performance to meet the specification on end channels as well, for example. The above-described approach may also reduce the need for any special or unique changes or compensations to the modem software or calibration software.

Another potential advantage of the above-described approach is that it may reduce the necessity for collecting large volumes of factory yield data to refine ILPC performance through software methods such as the modification of non-volatile memory parameters. This may be significant in that analysis of factory data is typically an iterative process which occurs over the build of several thousand units. Moreover, the above-described approach may also reduce dependency on temperature variations and component variations, as well as potentially avoiding special calibration procedures. More particularly, the complexity of factory calibration routines may be reduced, including calibration of end channels. By not having to specifically calibrate the end channels, time may accordingly be saved during the factory calibration process, which may translate to cost savings. Another significant consideration of the above-described approach is that it may result in a relatively low impact on current consumption versus transmit output power. The increased current consumption was found to be less than 1% in the above-noted test configuration including the shunt resistor 34.

Example components of a mobile communications device 1000 that may be used in accordance with the above-described embodiments are further described below with reference to FIG. 13. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 13:
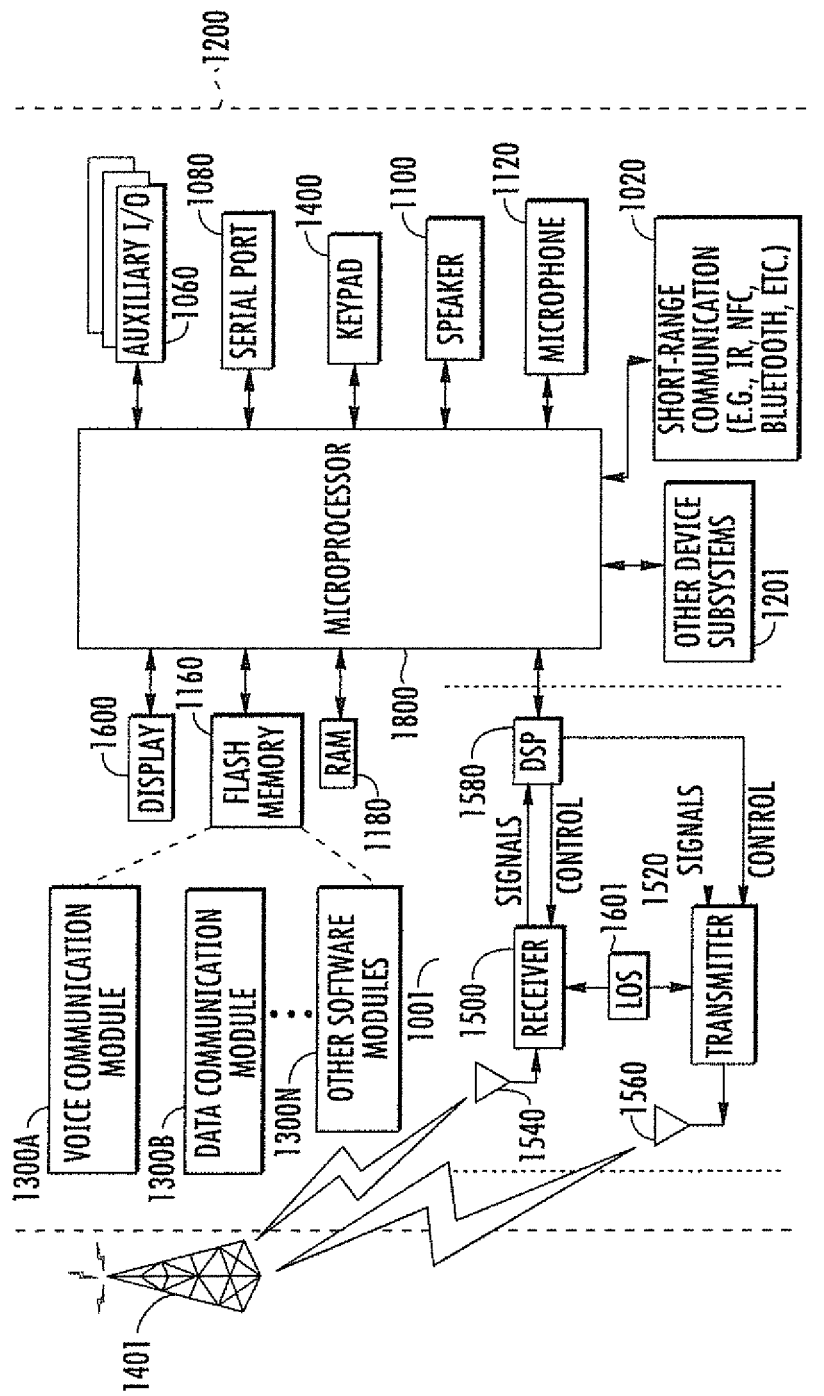
FIG. 13 is a schematic block diagram illustrating example mobile communications device components that may be used with the mobile communications device shown in FIG. 1.

In addition to the processing device 1800, other parts of the mobile device 1000 are shown schematically in FIG. 13. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile communications device comprising:
   a radio frequency (RF) signal source configured to generate RF signals over at least one RF frequency band;
   an RF transmitter coupled to the RF signal source and comprising
      an RF amplifier configured to operate over a plurality of different power control levels, the RF amplifier having an input configured to receive the RF signals from the signal source and an output having an impedance which changes based upon changes between the different power control levels,
      a pass-band filter having an input coupled to the output of the RF amplifier and an output, and
      a shunt resistance network having a first terminal coupled to the output of the RF amplifier and the input of the pass-band filter, and a second terminal coupled to a voltage reference, wherein the shunt resistance network is configured to decrease a highest impedance change of the RF amplifier output to below a threshold impedance level, wherein the shunt resistance network is configured to maintain the RF amplifier output between a maximum power threshold and a minimum power threshold; and
   at least one antenna coupled to the output of the pass-band filter and configured to operate over the at least one RF frequency band.

2. The mobile communications device of claim 1 wherein the pass-band filter comprises a surface acoustic wave (SAW) filter.

3. The mobile communications device of claim 1 wherein the shunt resistance network comprises a Pi configuration having only resistors.

4. The mobile communications device of claim 1 wherein the shunt resistance network comprises a Pi configuration having a resistor and an inductor with a capacitor therebetween.

5. The mobile communications device of claim 1 wherein the shunt resistance network comprises a T configuration having a resistor and capacitors.

6. The mobile communications device of claim 1 wherein the maximum power threshold and the minimum power threshold are selected according to an inner loop power control specification.

7. The mobile communications device of claim 1 further comprising an LC network having an input coupled with an output of the pass-band filter.

8. The mobile communications device of claim 1 wherein the at least one RF frequency band comprises at least one Universal Mobile Telecommunications System (UMTS) frequency band.

9. The mobile communications device of claim 1 wherein the threshold impedance level is based upon an inner loop power control (ILPC) output level.

10. The mobile communications device of claim 1 wherein the voltage reference comprises ground.

11. A mobile communications device comprising:
a radio frequency (RF) signal source configured to generate RF signals over at least one RF frequency band;
an RF transmitter coupled to the RF signal source and comprising
an RF pre-amplifier configured to operate over a plurality of different power control levels, the RF pre-amplifier having an input configured to receive the RF signals from the RF signal source and an output having an impedance which changes based upon changes between the different power control levels,
a surface acoustic wave (SAW) filter having an input coupled to the output of the RF pre-amplifier and an output, and
at least one shunt resistor having a first terminal coupled to the output of the RF pre-amplifier and the input of the SAW filter, and a second terminal coupled to ground, the at least one shunt resistor configured to decrease a highest impedance change of the RF preamplifier output to below a threshold impedance level, the at least one shunt resistor configured to maintain output power between a maximum power threshold and a minimum power threshold;
an RF power amplifier having an input coupled to the output of the SAW filter and an output; and
at least one antenna coupled to the output of the RF power amplifier and configured to operate over the at least one RF frequency band.

12. The mobile communications device of claim 11 wherein the at least one shunt resistor comprises a plurality of parallel-connected resistors.

13. The mobile communications device of claim 11 wherein the at least one RF frequency band comprises at least one Universal Mobile Telecommunications System (UMTS) frequency band.

14. A method for making a mobile communications device comprising:
coupling an input of a radio frequency (RF) amplifier to an RF signal source, the RF signal source being configured to generate RF signals over at least one RF frequency band, and the RF amplifier being configured to operate over a plurality of different power control levels and having an output with an impedance which changes based upon changes between the different power control levels;
determining a highest impedance change of the RF amplifier output based upon the changes between the different power control levels;
coupling an input of a pass-band filter to the output of the RF amplifier, and coupling a first terminal of at least one shunt resistor to the output of the amplifier and the input of the pass-band filter, and coupling a second terminal of the at least one shunt resistor to a voltage reference, the at least one shunt resistor being configured to decrease the highest impedance change of the RF amplifier output to below a threshold impedance level, the at least one shunt resistor being configured to maintain the RF amplifier output between a maximum power threshold and a minimum power threshold.

15. The method of claim 14 wherein the pass-band filter comprises a surface acoustic wave (SAW } filter.

16. The method of claim 14 wherein the at least one shunt resistor comprises a plurality of parallel-connected resistors.

17. The method of claim 14 further comprising coupling at least one of a capacitor and an inductor in series with the at least one shunt resistor.

18. The method of claim 14 wherein the at least one RF frequency band comprises at least one Universal Mobile Telecommunications System (UMTS) frequency band.

19. The method of claim 14 wherein the voltage reference comprises ground.

* * * * *